June 15, 1937.    O. P. HAEGELE    2,083,783
WEIGHING APPARATUS
Filed July 26, 1935    3 Sheets-Sheet 1
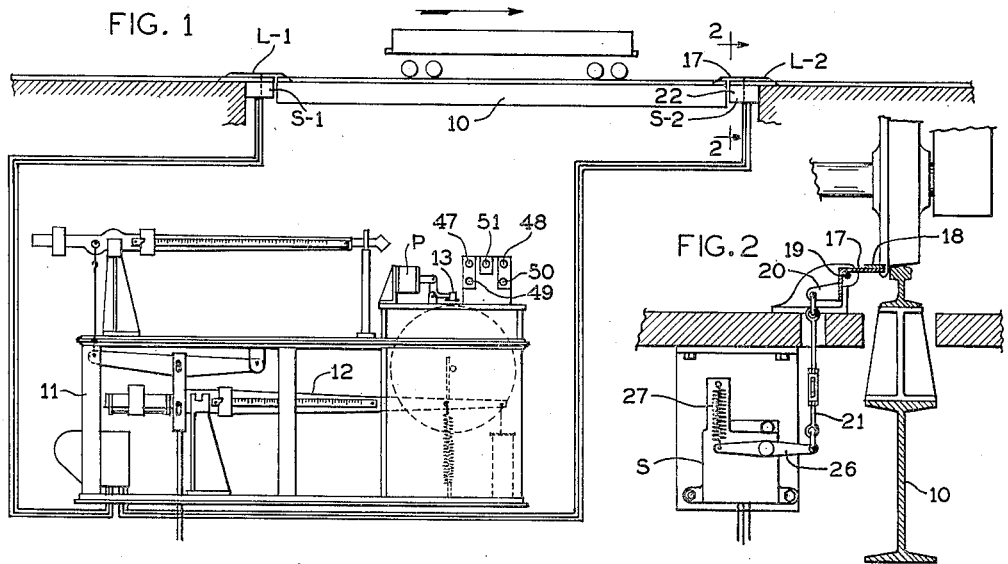
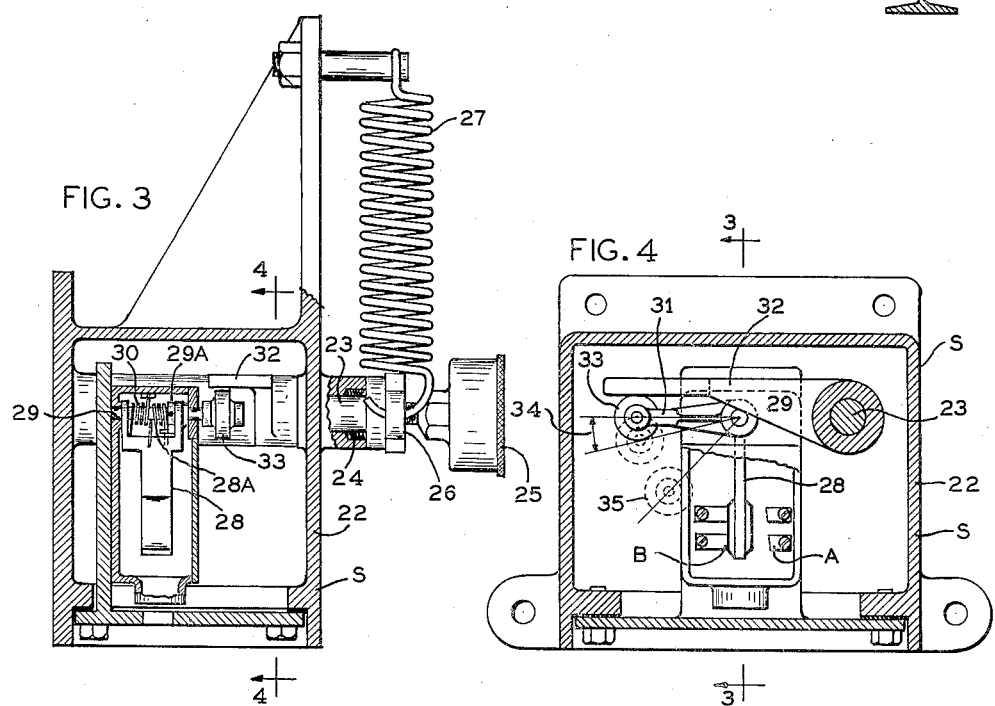
INVENTOR
OTTO P. HAEGELE.
BY Roland C. Rehm
ATTORNEY.

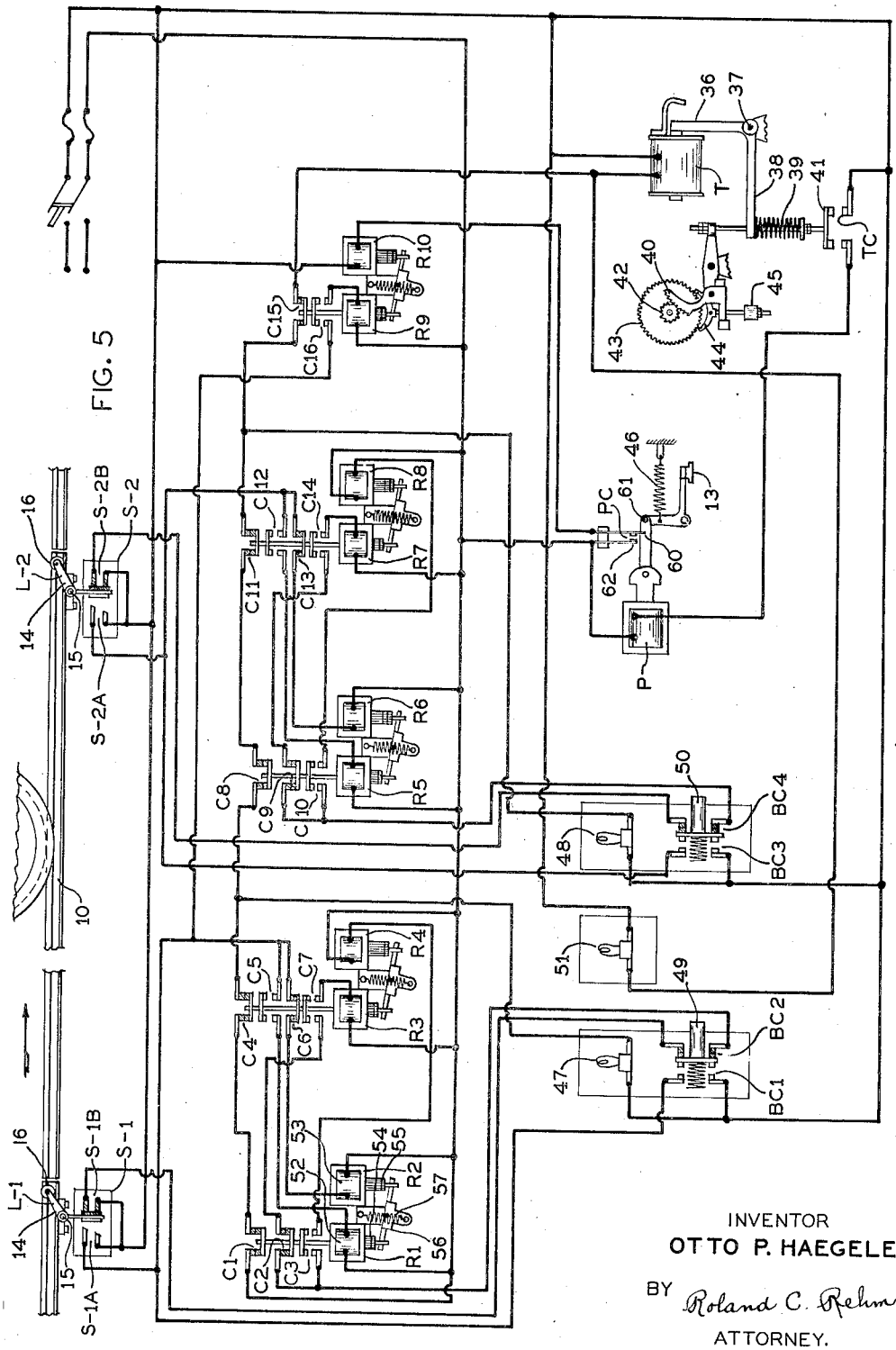

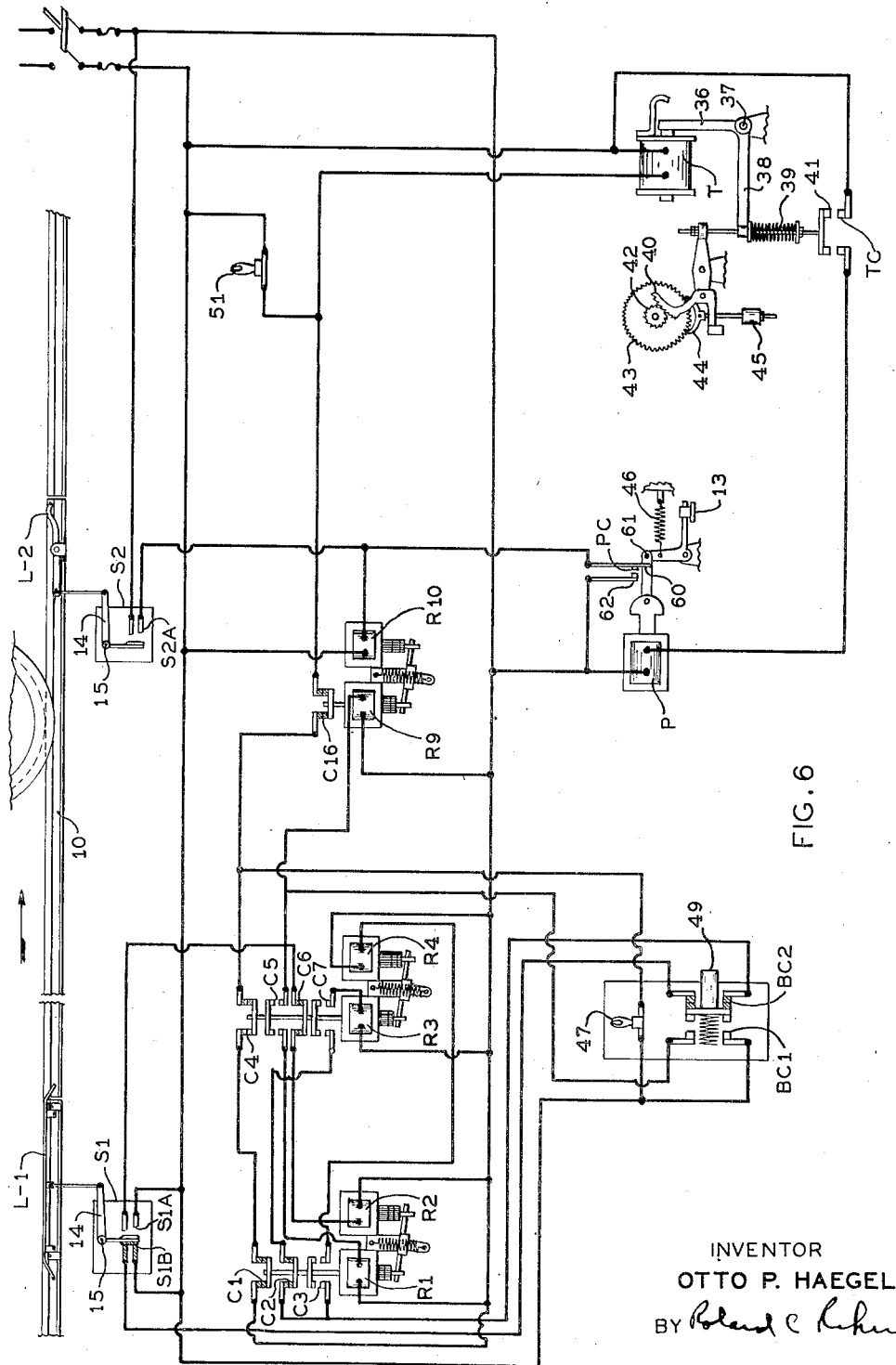

Patented June 15, 1937

2,083,783

UNITED STATES PATENT OFFICE 2,083,783

WEIGHING APPARATUS

Otto P. Haegele, Chicago, Ill., assignor to Streeter-Amet Company, Chicago, Ill., a corporation of Illinois Application July 26, 1935, Serial No. 33,305

10 Claims. (Cl. 265—5)

This invention relates to so-called motion weighing and, among other objects, aims to provide improved and simplified apparatus for weighing and recording the weights of a succession of loads passing across a scale platform.

The nature of the invention may be readily understood by reference to one illustrative installation embodying the invention and shown in the accompanying drawings.

In said drawings:

Fig. 1 is a diagrammatic view of a track scale platform and associated weighing and recording apparatus;

Fig. 2 is a sectional view taken approximately on the plane 2—2 of Fig. 1 showing a track lever and switch operated therefor, designed for operation by the truck in a railroad car;

Fig. 3 is a transverse sectional elevation of one of the aforesaid switches;

Fig. 4 is a sectional view thereof taken approximately on the plane 4—4 of Fig. 3;

Fig. 5 is a diagram illustrating the control system for such apparatus; and

Fig. 6 is a similar diagram of a simplified control system.

In motion weighing, as distinguished from dormant weighing, the control of the loads (e. g. vehicles) to be weighed is not absolutely in the hands of the weigh-master; and it is desirable therefore to provide means which inhibit the recording of weights if more than one vehicle be on the scale platform at a time and, as in the present case, if the vehicle does not remain wholly and alone on the scale platform long enough to allow the scale to come to balance. For example, in so-called gravity (or "hump") weighing in railroad yards wherein the cars run down a slight incline and across the scale platform in uncoupled condition, the speed of the car and the length of the scale platform alone determine how long the car remains on the platform. Heretofore various mechanical devices operated by the car wheels have been employed to control the operation of the recorder but these have involved long trains of mechanism which were expensive and difficult to maintain in working condition. Furthermore, their operation caused additional vibration and involved a substantial time lag which either shortened the weighing time or made a reduction in speed of the car necessary.

The invention is here shown embodied in an apparatus which is inexpensive as compared to the aforesaid operating mechanism, and which requires practically no force to operate and is practically instantaneous in operation. The scale platform 10 which may be of any approved construction, is designed for rail cars. Practically the same arrangement may of course be employed for weighing trucks or other vehicles passing in succession across the scale platform. For present purposes the scale platform is characterized by "live" rail sections (see Figs. 1 and 2 exceeding in length that of the longest car intended to be weighed, and supported upon an appropriate system of scale levers connected to an appropriate scale 11 having recording apparatus 12 including a printing hammer 13 by which the weight of the load on the scale may be printed on a tape, card or other record. Typical recording track scales of this character are shown in Wiley Patents Nos. 1,581,769, 1,581,771, and 1,597,853.

As stated above, the apparatus has among its functions to prevent erroneous or inaccurate recorded weights by inhibiting operation of the recorder unless the car or other vehicle to be weighed remain alone on the scale for a predetermined length of time, e. g., four seconds. The time interval is that necessary, including a substantial factor of safety, to permit the scale to come to true balance so that when the recorder is actuated it will record the true load on the scale. Corollaries of the foregoing conditions are that no weight shall be recorded (1) if the vehicle leaves or partly leaves the scale before the aforesaid time interval has elapsed; (2) if another vehicle enters the scale during this interval, or (3) if the normal sequence of operations is disturbed, e. g., by a vehicle entering and/or withdrawing from the scale instead of passing entirely across it, or by inadvertent actuation of a control device by a person walking upon the scale.

Associated with the scale platform and intended to be operated by the vehicle in passing upon and leaving the scale are switch members represented somewhat diagrammatically by levers L1 and L2. Such levers may carry a roller to be engaged by the wheel as shown in Fig. 5, or may present a short horizontal bar to the wheel flange as shown in Fig. 2. In either case the levers offer a minimum resistance to operation and therefore eliminate the vibration incident to the operation of a long train of mechanism by the car wheel. In the present instance, the levers operate electric switches S1 and S2 which are connected in a control system for controlling the operation of the recorder as aforesaid. The apparatus may be designed for actuation either by the individual wheels of a car (as illustrated for example in Fig. 5) or for actuation by the trucks of the car regardless of whether the truck is a four-wheel or six-wheel truck. The latter arrangement is preferable if the number of wheels per truck varies for different cars. In actual practice at the present time, such conditions are rarely met with, railroad freight cars practically uniformly having two four-wheel trucks and mine and similar cars having uniformly only four wheels per car.

A wheel-operated (as distinguished from a truck-operated) device may comprise a simple lever 14 pivoted at 15 and carrying a roller 16 positioned adjacent the track so that it may be depressed by the flange of each wheel moving past it. It should be understood however that the lever may carry a short bar which is depressed by the wheel flange. In Figs. 1 and 2 is illustrated a truck operated switch which comprises an elongated track lever 17 located so as to be depressed by the flange of the first wheel engaging it and to remain depressed until the last wheel of that truck has passed beyond the lever. As here shown, such lever comprises a bar 18 located adjacent the inside of a rail head so as to be engaged and depressed by the wheel flange. The bar is of course made longer than the distance between two wheels of a truck so that it will not rise between adjacent wheels but will remain depressed as aforesaid. The lever is pivoted at 19 and carries a bell crank arm 20 which actuates the switch S2 or S1 as the case may be, being connected thereto by an adjustable link 21.

Whether the switches S be wheel-operated or truck-operated, one switch S1 is located at the entrance to the scale platform or live rail section and the other switch S2 at the exit end of the scale platform so that the switch S1 will be actuated as a wheel or truck is about to enter the scale platform and the switch S2 will be actuated as the wheel or truck is about to leave the scale platform.

The switches S may be of any appropriate design and preferably should embody a lost motion mechanism which will permit variation in the degree to which the levers L1 and L2 are depressed without damage to the electrical contact mechanism of the switch. Switches of this type are generally characterized as limit switches and may be purchased on the open market. One such switch is illustrated in Figs. 3 and 4 enclosed in a tight housing 22 designed to protect the mechanism on the interior against the entrance of moisture. To that end the switch operating shaft 23 is provided with a stuffing box 24 carrying a grease cup 25 by which entrance of moisture at this point is prevented and the shaft is lubricated. Supporting hubs project in both directions from the housing wall to provide an adequate bearing which is lubricated by grease cup 25. The outer end of the shaft carries an operating lever 26, one end of which is connected to a spring 27 by which the switch is restored to initial position after each operation thereof. On the interior of the housing is a contact arm 28 loosely mounted on shaft 29 and adapted alternately to engage sets of contacts A or B. In the present instance the arm is normally held in engagement with contacts B by torsion spring 30, one end of which bears against contact arm 28, resiliently pressing it against contacts B (see Figs. 3 and 4). Shaft 29 has fixed thereto a rocker arm 31 adapted to be depressed (as shown in the dotted positions in Fig. 4) by the operating arm 32 fixed to and operated by shaft 23. The rocker arm carries an anti-friction roller 33. Movement of rocker 31 is communicated to contact arm 28 through spring 28a, one end of which bears against arm 28 and the other end of which is connected to a collar 29a fastened to shaft 29.

The foregoing arrangement allows the operating arm to have the substantial surplus of movement over that necessary to actuate contact arm 28. As indicated in Fig. 4, the switch contacts A are closed if the rocker arm 31 be moved only through the small angle 34 but arm 31 is free to move with the operating arm 32 to the position 35 without damage to the switch mechanism. This insures actuation of the track switch whenever a wheel passes over it without requiring adjustment of the degree of movement for the protection of the switch. When operating arm 32 and rocker 31 are released and rise, the contact arm is restored to its initial position, closing contacts B, by spring 30.

Associated with the track switches are a series of relays R whose predetermined operation is essential to the operation of the timing device T and the recorder printing hammer 13.

The timing device T which determines the interval prior to actuation of the recorder printing hammer 13 may be of any appropriate design. The device diagrammatically illustrated in Fig. 5 is one form of time delay relay manufactured by the General Electric Company and obtainable on the open market. A timing relay of this general character is illustrated in Patent No. 1,768,452 assigned to the General Electric Company. Its details form no part of the present invention. As here shown, the relay mechanism comprises the solenoid coil T adapted to act on an armature 36 pivoted at 37 and carrying an arm 38 which serves to compress spring 39. The other end of the spring is carried by a pivoted curved rack 40 associated with which is a pair of contacts 41. Rack 40 meshes with pinion 42 coaxial with which is an escapement ratchet 43 controlled by escapement 44. The latter has an adjustable pendulum 45, the bob of which may be moved up or down to vary the period of the timer. When timer coil T is energized, spring 39 is compressed, thus exerting a downward force on rack 40. The latter can move only as rapidly as the timing pendulum 45 and escapement will allow, but in a predetermined period (in this case about four seconds) it advances sufficiently to clear pinion 40 and thereby to allow contacts 41 suddenly to close on contacts TC and establish a circuit through the latter. It will be noted that the teeth on rack 40 are beveled in one direction so that when the timer coil T is deenergized, the rack teeth will slip out of mesh with pinion 42 and the rack may return rapidly without the necessity of operation of the pendulum and the escapement.

From the foregoing it will be seen that the function of timer T is to delay the closing of contacts TC for a predetermined length of time after the timer coil has been energized. As will presently appear, the timer T is not energized unless and until the scale platform is cleared of a preceding car, if any, and another car has passed completely onto the scale platform. This inaugurates the operation of the timer which, at the end of the predetermined interval, will operate the recorder provided during such interval the car does not start to leave the scale platform and no other car enters or partly enters the platform.

The recording mechanism, in so far as it relates to the actuation of the printing hammer, comprises the solenoid coil P which serves to energize the printing hammer operating spring 46 and to release the latter (on deenergization of the solenoid coil P) to operate the printing hammer 13 to record the weight of the car on the scale.

Associated with the recorder are signal devices in the form of a pair of green signal lamps 47 and 48 which give a visual indication of the condition of the system, namely whether or not the circuits are properly coordinated. Among other purposes they serve to indicate whether the system has been disturbed by an irregularity in the operation of the track levers L1 and L2. In the present instance, if the green light 47 be lighted, it indicates that there has been no abnormal operation of switch S1 and that the circuits controlled thereby are properly coordinated for the entry of a car upon the scale. Likewise, if green light 48 be visible, it indicates that no part of a preceding car remains on the scale and the circuits controlled by exit switch S2 are therefore properly coordinated for normal operation of the apparatus. If there has been any disturbance or unusual operation of either of the switches S1 and S2, both lights 47 and 48 will not be lighted, thereby indicating that there has been some antecedent irregularity and that the system is therefore not coordinated properly. Assuming that no car is on or partly on the scale, proper coordination is effected merely by operation of push button switches 49 and 50. If light 47 be not lighted at the proper time, the push button switch 49 is pushed several times to make contacts BC1 until the light lights. Similarly, repeated operation of switch 50 serves eventually to establish a circuit through light 48. Switches 49 and 50 are connected in multiple with contacts S—1A and S—2A respectively and simply produce the same effect in the circuit as though switches L1 and L2 were depressed. Thus it is possible to reestablish proper coordination of circuits if either switch L1 or L2 had been improperly depressed. Lack of coordination would occur for example if an individual walking on the platform depressed either of the track switches or if a car were pushed partly on the platform and then withdrawn.

An additional visual signal, in this instance in the form of a red light 51, is provided to indicate the interval during which the timer T is energized. Thus if a car is placed upon the scale and the red light does not presently show, it will indicate some lack of coordination which must be restored by operation of one or both push buttons 49 and 50 before the timer will be energized and the red light will show.

In Fig. 5 is illustrated diagrammatically one arrangement of circuits designed for cars such as mine cars having only four wheels (i. e. two wheels on each rail) and in which the track levers are wheel-operated. Thus the entering track lever L1 must be depressed two times as one prerequisite to the operation of the timer. If the preceding car as it left the scale depressed the exit track lever L2 two times (thereby establishing that no preceding car remains on the scale), then the circuits are in proper coordination and the timer will be energized and after the predetermined interval the recorder will be operated to print the weight of the car.

The relays R associated with the switches S1 and S2 are of a standard type, being known commercially as "locking relays". Each comprises a pair of solenoid coils 52 and 53 whose cores or armatures 54 and 55 are connected to a rocking arm 56 which is held in one position or the other by toggle spring 57. Thus (as shown in Fig. 5), if the solenoid coil R1 be energized even momentarily, its core 54 is held by spring 57 in elevated position after the circuit is opened. It is not lowered unless and until coil R2 be energized. In that event it will be held in lowered position by spring 57. Associated with the solenoid cores are a series of contacts C, some of which are closed when the solenoid cores R1, R3, etc. are energized and some of which are opened at this time (see Fig. 5).

It should be understood that the condition of the circuits as shown in Fig. 5 is that which must be established for proper operation prior to the entry of a car on the scale platform. The following is a brief catalogue of the sequence of operations which take place in the normal use of the apparatus:

*Entry of car upon scale platform and actuation of entering track lever L1*

1. First wheel depressing L1 closes contacts S—1A which establishes a circuit through contacts C6. The latter circuit energizes relay coil R2, thus opening contacts C1 and C2 and closing contacts C3. Closed contacts S—1A also establish a circuit through relay coil R9, energizing the solenoid to open contacts C16 and close contacts C15.

When the first wheel leaves switch L1 allowing it to rise, contacts S—1B are closed, establishing a circuit through contacts C3 and BC2 and operating relay R4 to open contacts C4 and C6 and close contacts C5 and C7.

2. The second wheel engaging switch lever L1 again closes contacts S—1A establishing a circuit through contacts C5 and actuating relay R1 to close contacts C1 and C2 and open contacts C3.

When the second wheel leaves the switch lever L1, contacts S—1B are again closed, establishing a circuit through contacts C2 and C7 which energizes relay R3, thereby closing contacts C4 and C6 and opening contacts C5 and C7. Relays R5, R6, R7, and R8 remain in the position shown in Fig. 5, having been so positioned by the operation of exit switch lever L2 as operated by the preceding car in leaving the scale platform.

*Operation of timer*

3. The closing of contacts C4 as aforesaid establishes a circuit through contacts C1, C4, C9, C11, C15 and timer coil T, thereby operating the timer mechanism as aforesaid which results after the lapse of the predetermined period (in this case four seconds) in closing contacts TC. The red signal light 51, being connected in multiple or across the terminals of the timer solenoid T, is also lighted to indicate the operation of the timer.

Incidentally, when contacts C1 and C4 are closed, a circuit is established through the green light 47 thereby indicating that the circuits associated with the entering switch S1 are in readiness for another car but green light 48 does not show at this time, therefore indicating that all circuits are not in readiness for another car. Unless some abnormal operation of the former circuits occurs in the meanwhile, green light 47 will remain lighted until a car again operates switch S1.

4. When contacts TC are closed at the expiration of the time interval, the circuit through the printer solenoid is closed (the latter being simply connected in series with contacts TC across the line). The printing solenoid core is thus actuated energizing recorder operating spring 46 and at the same time closing printer contacts PC, one of which is supported on a spring member 60 which lies in the path of a projection 61 moved by the solenoid core and which closes the circuit through the other contact 62 likewise mounted on a spring member. Contacts PC control relay solenoid R10 and the circuit established on the closing of the contacts results in the opening of contacts C15 and the closing of contacts C16.

Operation of recorder

5. The opening of contacts C15 as aforesaid breaks the circuit through timer solenoid T (see paragraph #3) which opens contacts TC and breaks the circuit through printer solenoid P, thereby allowing spring 46 to operate the recorder printing hammer and record the weight.

At the same time the circuit through the red signal light is broken, thereby indicating that the timer and recorder sequence of operations has not commenced.

Exit of car from scale platform and actuation of exit track switch lever L2

6. The first wheel depressing lever L2 closes contacts S—2A and establishes a circuit through contacts C13 and relay solenoid R6, thereby energizing the latter to open contacts C8 and C9 and to close contacts C10.

When the first wheel leaves lever L2 and the latter rises, it closes contacts S—2B, thereby establishing a circuit through contacts C10, BC4 and relay solenoid R8, energizing the latter to open contacts C11 and C13 and closing contacts C12 and C14.

7. The second wheel again closes contacts S—2A, establishing a circuit through contacts C12 and relay solenoid R5, thereby energizing the latter to close contacts C8 and C9 and to open contacts C10.

When the second wheel leaves switch lever L2, contacts S—2B are again closed, establishing a circuit through contacts BC4, C9, C14 and relay solenoid R7, thereby energizing the latter to close contacts C11 and C13 and opening contacts C12 and C14. This restores the system to the initial condition necessary for the weighing of another car when it is placed on the scale. The latter condition requires that contacts C8 and C11 be closed.

It should be noted that simultaneous operation of the track switches does not upset the normal operation of the device and further, that operation of the exit track switch S2 before the recorder is operated (as where the car passes across the platform too rapidly) does not require any readjustment prior to weighing of the next car.

8. The proper coordination of the circuits associated with the exit track switch is indicated by the lighting of green light 48 by the circuit established through closed contacts C1, C4, C8, and C11. The entering signal light 47, being controlled by contacts C1 and C4, has remained lighted since the operation of the timer coil. Both lights being visible and the red light not showing, the circuits are properly coordinated for the moving of another car upon the scale.

As illustrating the protection afforded by the apparatus against faulty recording, let us assume that a car passes across the scale at an excessive speed and engages the exit switch L2 before the elapse of an adequate time interval (in this case four seconds). In that event the closing of the circuit through contacts S—2A will energize solenoid coils R6 and open contacts C8. The opening of the latter breaks the circuit through timer solenoid T, thus interrupting the operation of the timer mechanism (restoring it to initial position), thereby preventing the closing of the recorder operating switch TC.

As a second illustration, let us assume that another car enters the scale platform before the aforesaid time interval has elapsed for the car then on the scale. In that event contacts S—1A will be closed, energizing solenoid coil R2 and opening the circuit through contacts C1. The latter, also being in the energizing circuit of timer solenoid T, bring about deenergization of the latter and the interruption of the timing operation as aforesaid.

Coordinating of circuits

9. As stated above, if irregularity in any of the circuits occurs through improper operation of either of the switch levers L1 and L2, proper coordination may be restored by operation of push buttons 49 or 50 or both until the respective green lights 47 and 48 become lighted. Contacts BC1 are connected in multiple with contacts S—1A and contacts BC2 are connected in series with contacts S—1B,—therefore the operation of push button 49 simply performs the same functions as the complete operation of switch S1. The same is true of the operation of push button 50 as regards switch S2. For this purpose push button contacts BC3 are connected in multiple with contacts S—2A and contacts BC4 are connected in series with contacts S—2B.

In Fig. 6 is illustrated a simplified system wherein safety features not generally required, are omitted. As will presently appear, the simplified system is entirely adequate for the great majority of gravity car weighing practices.

The exit track switch L2 is simplified by employing only a single pair of contacts S—2A which are closed as a wheel depresses the switch lever L2. The relays controlled by the exit track switch as in Fig. 5 are omitted and the safety features provided thereby are absent. As regards the entrance track switch, the circuits and relays controlled thereby are substantially identical with those shown in Fig. 5, and their operation need not again be described in detail. Similar elements have been designated by similar reference characters.

The system is here shown arranged for a double truck car such as the ordinary railroad car and for that purpose an elongated track-actuated lever L1 is employed to operate the entrance switch S1. Such lever may advantageously be of the type illustrated in Figs. 1 and 2. It will be understood that the length of the lever is such that it is depressed once only for an entire truck and not for each wheel of the truck. If the system be designed for mine cars or other cars having only two single pairs of wheels, wheel-operated switches such as are shown in Fig. 5 are preferably employed.

The principle of operation of the system is generally the same as that disclosed in Fig. 5, namely, the circuits associated with the relays R1, R2 etc. require a predetermined operation before establishing the circuit through the timer mechanism. Thereupon the timer mechanism starts and after a predetermined period will effect the operation of the recorder unless in the meanwhile either of the switches S1 or S2 be operated. If the latter operation occur, then the operation of the timer is interrupted and it is restored to initial position.

The diagram, Fig. 6, illustrates the condition of the circuits when a car is entirely and alone upon the platform and the timer mechanism has been started to measure the time interval. The next incident to occur is the closing of timer switch TC and the energizing of the recorder coil P. When this occurs, contacts PC are closed, thereby energizing relay coil R10 to open contacts C16. The opening of the latter contacts breaks the circuit through timer T and successively results in the opening of contacts TC and the release of the recorder solenoid to allow a spring 46 to operate the printer hammer 13. At the same time contacts PC are again opened. It will be evident that the foregoing sequence of operations occurs practically instantaneously.

In operation the leading truck of a car depresses lever L1 before it enters the scale platform, closing contacts S—1A and establishing a circuit through contacts C6. The latter circuit energizes relay coil R2, thus opening contacts C1 and C2 and closing contacts C3. When the truck leaves switch lever L1 allowing it to rise, contacts S—1B are closed, establishing a circuit through contacts C3 and BC2 and operating relay R4 to open contacts C4 and C6 and close contacts C5 and C7.

When the second truck later depresses lever L1 and closes contacts S—1A, a circuit is established through contacts C5, thereby actuating relay R1 to close contacts C1 and C2 and open contacts C3. As the truck leaves the switch lever L1 (the car then being entirely on the scale platform), contacts S—1B are again closed to establish a circuit through contacts C2 and C7 to energize relay R3, thereby closing contacts C4 and C6 and opening contacts C5 and C7. The opening of contacts C7 again breaks the circuit through coil R3, thereby protecting the coil against the possibility of prolonged energization.

Relays R9 and R10 which cooperate in the control of the timer and printing mechanism remain in the position shown in Fig. 6, having been so positioned by the operation of the entrance track lever L1 by a car in passing wholly upon the scale platform. It should be noted that in the present instance relays R9 and R10 control only a single pair of contacts C16.

The closing of contacts C4 as aforesaid establishes a circuit through contacts C1, C4, C16 and timer coil T, thereby operating the timer mechanism as aforesaid which after the lapse of a predetermined period of time, results in a closing of contacts TC (assuming that the car still remains wholly on the scale platform).

Incidentally, when contacts C1 and C4 are closed, a circuit is established through green signal light 47. This signal indicates that the relays controlling contacts C1 and C4 are properly positioned for the entrance of a car upon the scale. If the signal does not show, a circuit through it may be restored by pushing push button 49 one or more times until the circuit is again established. This at the same time restores the solenoids including solenoid R9 to the proper relative positions.

Another signal 51 which may advantageously be a red light, indicates that contacts C1, C4, and C16 are closed and the timer T is operating.

If and when the car remains wholly on the platform for the predetermined period, the printing mechanism is then actuated as described in connection with Fig. 5. If however the car should pass across the scale too rapidly and depress the exit lever L2 before the lapse of the predetermined timing period, the closing of contacts S—2A establishes a circuit through relay R10 breaking contacts C16 and thereby breaking the circuit through timer coil T and interrupting the operation of the timer. Repeated depression of lever L2 by the following wheels results simply in the idle energization of relay R10 without any disturbance of other circuits.

The system is not thrown out of coordination by variation in the sequence of operation of switches S—1 and S—2 nor by their simultaneous operation by cars coming on and leaving the scale.

Since in ordinary gravity weighing operations cars pass by gravity in one direction only across the scale, it is ordinarily not important that the system be protected against improper functioning on account of a car entering the scale from the exit end. This is practically impossible under ordinary conditions since a car cannot run uphill and no other means are present for pushing it uphill. However, if a car should for some unusual reason come to rest partly on the scale platform and the scale platform be sufficiently long to allow the following car to enter entirely on the scale platform, an inaccurate weight might result. These conditions are so abnormal however as to come at once to the attention of the weigh-master who could prevent the recording of an inaccurate weight simply by pressing button 49. This would also break the circuit through the timer coil T and interrupt the operation of the timer. The great simplification in the system effected by the elimination of unnecessary safety features, greatly outweighs the need for protection against conditions which probably would never occur.

It is apparent from the foregoing that the interrelations of the various elements of the illustrative control systems not only avoid the recording of false weights but insure maximum accuracy by allowing ample time for the scale to come to balance before a record is made. Indeed, a greater proportion of the total elapsed time per car weighing may be allowed for the scale to come to balance, since no appreciable time is consumed in operation of the apparatus, as contrasted with the actuation of long trains of mechanical devices such as shown for example in the aforesaid Wiley patents. Vibration incident to mechanical (as distinguished from electrical) operation of control devices, as in the apparatus of the aforesaid Wiley patents and the consequent impairment of accuracy of the recorded weights, is avoided. In addition, the operator is apprised not only of abnormal conditions which prevent the operation of the recorder, but is continuously advised whether normal operating conditions prevail. The apparatus is not only foolproof for the aforesaid reasons, but restoration of the systems to normal conditions (because of faulty operation) can be effected by the ordinary workman and does not require an intimate knowledge of the operating mechanisms or their controlling circuits.

Obviously the invention is not limited to the details of the illustrative embodiments herein shown and described, since these may be variously modified. Moreover, it is not indispensable that all features of the invention be used conjointly since various features may be used to advantage in different combinations and subcombinations.

Having described my invention, I claim:

1. The combination with weighing apparatus including a scale platform for weighing load carrying vehicles, an electrically actuated recording device for recording the weight of the load on the scale, electric switches adjacent the ends of the platform and positioned to be actuated respectively by vehicles coming on and leaving the scale platform, timing mechanism controlling the recording device for effecting a predetermined lag before the operation of the latter, and electric timer actuating circuits including relays adapted to be actuated in sequence by predetermined operations of said switches by the vehicle to energize said timing mechanism when the vehicle is completely and alone on the scale platform.

2. Apparatus for weighing a succession of railway cars or other vehicles comprising in combination weighing means including a scale platform, a recorder for recording the weight of a car on the scale, devices adjacent the ends of the scale platform to be operated by the car wheels in passing on and off the platform, recorder actuating means associated with said devices and operative to actuate said recorder upon predetermined operation of said devices, and signal means for indicating abnormal operation of said devices.

3. Apparatus for weighing a succession of railway cars or other vehicles comprising in combination weighing means including a scale platform, a recorder for recording the weight of a car on the scale, electric switch devices adjacent the ends of the scale platform to be operated by the car wheels in passing on and off the platform, recorder actuating means associated with said devices and responsive to predetermined normal operation of said devices to actuate said recorder, and signal lights having circuits associated with said recorder actuating mechanism for indicating normal and abnormal operation of said devices.

4. Apparatus for weighing load carrying vehicles comprising in combination weighing means including a scale platform, an electrically actuated recording device for recording the weight of the load on the scale, electric entrance and exit switches adjacent the ends of the platform and positioned to be actuated respectively by vehicles coming on and leaving the scale platform, timing mechanism controlling the recording device for effecting a predetermined lag before the operation of the latter, and electric timer actuating circuits controlled by said entrance switch inhibiting operation of said timer until the vehicle is alone on the scale platform.

5. Apparatus for weighing load carrying vehicles comprising in combination weighing means including a scale platform, an electrically actuated recording device for recording the weight of the load on the scale, electric entrance and exit switches adjacent the ends of the platform and positioned to be actuated respectively by vehicles coming on and leaving the scale platform, timing mechanism controlling the recording device for effecting a predetermined lag before the operation of the latter, electric timer actuating circuits controlled by said entrance switch inhibiting operation of said timer until the vehicle is alone on the scale platform, and circuits controlled by said exit switch for preventing operation of the recording device if the exit switch be prematurely operated.

6. Apparatus for weighing a succession of railway cars or other vehicles comprising in combination weighing means including a scale platform, a recorder for recording the weight of a car on the scale, electric switch devices adjacent the ends of the scale platform to be operated by the car wheels in passing on and off the platform, recorder actuating means associated with said devices, a series of circuits adapted to be successively established by a predetermined operation of said switch devices for operating said recorder, and means for restoring the circuits to original condition after operation of said recorder.

7. Apparatus for weighing a succession of railway cars or other vehicles comprising in combination weighing means including a scale platform, a recorder for recording the weight of a car on the scale, electric switch devices adjacent the ends of the scale platform to be operated by the car wheels in passing on and off the platform, recorder actuating means associated with said devices, a series of circuits adapted to be successively established by a predetermined number of actuations of each of said switch devices regardless of sequence of operation for operating said recorder, and means for restoring the circuits to original condition after operation of said recorder.

8. Apparatus for weighing a succession of railway cars or other vehicles comprising in combination weighing means including a scale platform, electric entrance and exit switch devices adjacent the respective ends of the scale platform to be operated by the car wheels in passing on and off the platform, a recorder for recording the weight of a car on the scale, recorder actuating means, and electric circuit means including said switch devices and said recorder actuating means for controlling the operation of said recorder and adapted upon predetermined operation of said entrance switch device to effect operation of said recorder, said circuit means also constructed and arranged to prevent operation of said recorder upon premature operation of said exit switch device.

9. Apparatus for weighing load carrying vehicles comprising in combination weighing means including a scale platform, electric entrance and exit switches adjacent the respective ends of the platform and positioned to be actuated respectively by vehicles coming on and leaving the scale platform, a recording device for recording the weight of the load on the scale platform, timing mechanism controlling the recording device for effecting a predetermined lag after a vehicle is wholly on the platform before the operation of the latter, and means including electric timer actuating circuits controlled by said switches inhibiting the beginning of the timing period until the vehicle is alone on the scale platform for a predetermined period.

10. Apparatus for weighing a succession of railway cars or other vehicles comprising in combination weighing means including a scale platform, a recorder for recording the weight of a car on the scale, electric entrance and exit switch devices adjacent the respective ends of the scale platform to be operated by the car wheels in passing on and off the platform, recorder actuating means associated with said devices, a series of circuits adapted to be successively established by a predetermined number of actuations of said entrance switch device for controlling the operation of said recorder, and a circuit controlled by said exit switch device for inhibiting the operation of said recorder under predetermined conditions.

OTTO P. HAEGELE.